Nov. 5, 1957  R. E. HEUGEL  2,812,424
REVOLVING ADVERTISING LIGHT
Filed Oct. 10, 1955  2 Sheets—Sheet 2
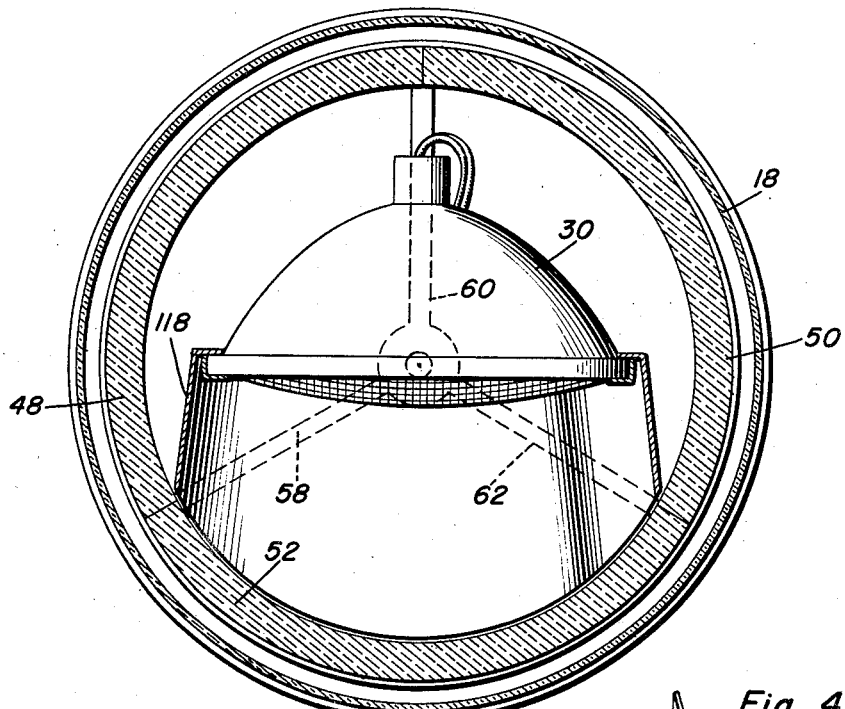
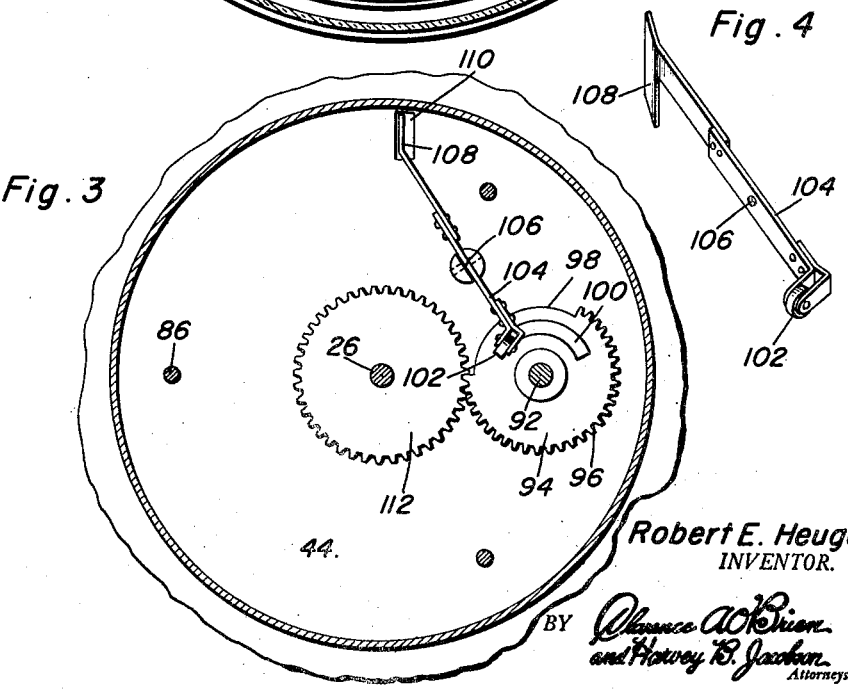
Robert E. Heugel
INVENTOR.

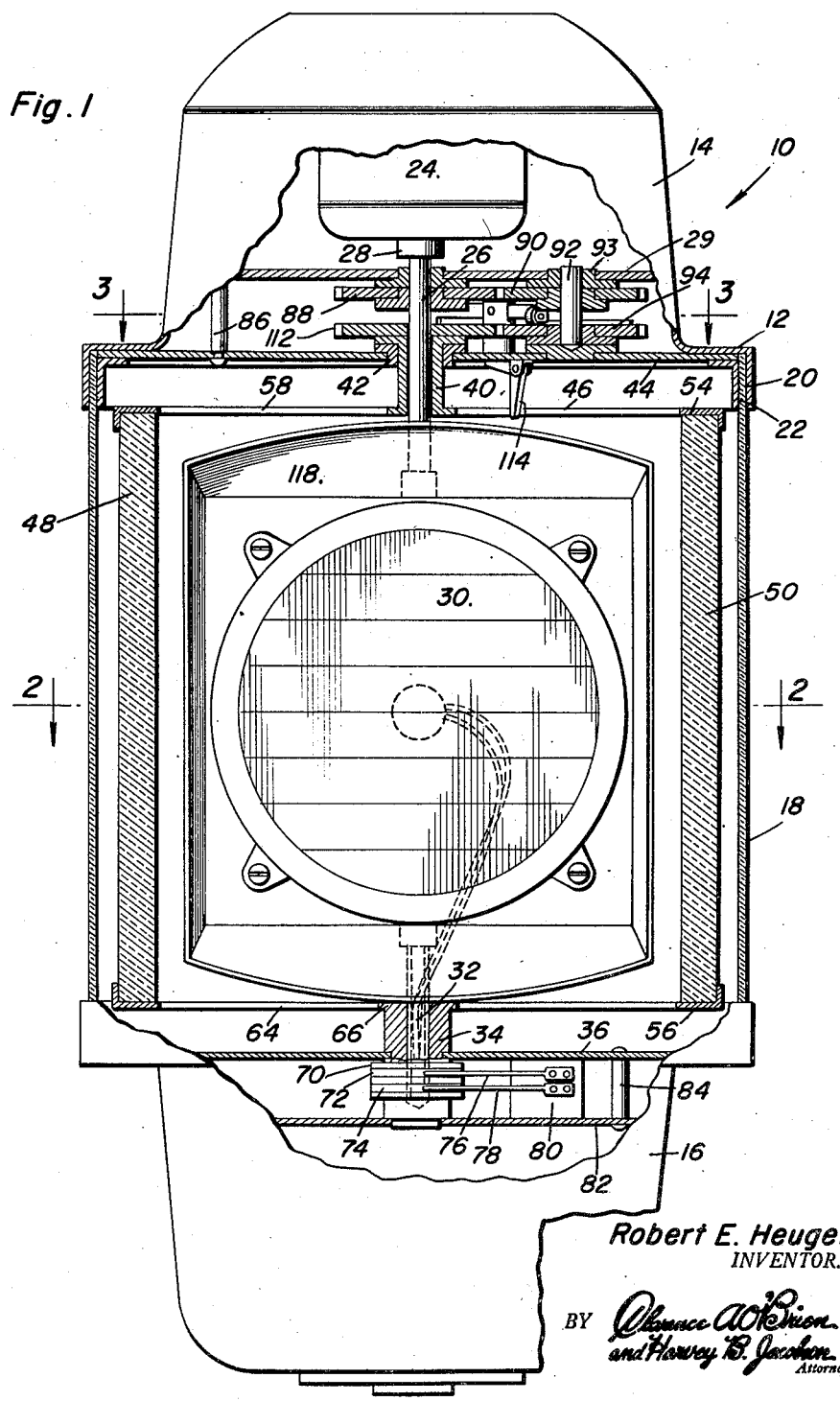

United States Patent Office 2,812,424
Patented Nov. 5, 1957

2,812,424

REVOLVING ADVERTISING LIGHT

Robert E. Heugel, Beasley, Tex.

Application October 10, 1955, Serial No. 539,407

1 Claim. (Cl. 240—10.1)

This invention relates to the class of illumination, and more particularly to a novel revolving advertising light.

The primary object of the present invention resides in the provision of means including varied colored lights for attracting the attention of people for use in promoting business and other related purposes.

The construction of this invention features a drum constructed of a plurality of separately colored lenses which is revolved relative to an outer casing. A source of illumination is mounted within the drum and is also revolved at a predetermined rate thereby positioning the source of illumination with respect to the drum in differing positions so that during a complete cycle of operation of the device, the source of illumination is directed through varied colored lenses.

Another object of the invention resides in the provision of novel means for stopping in a smooth and controlled manner the rotation of the revolving drum so as to position the drum with respect to the source of illumination.

Still further objects and features of this invention reside in the provision of a revolving advertising light that is simple in construction, highly attractive in appearance, and which is comparatively inexpensive to construct and install, thereby permitting wide distribution and utilization in the advertising field.

These, together with the various ancillary objects and features of the invention which will become apparent as the following description proceeds, are attained by this revolving advertising light, a preferred embodiment of which has been illustrated in the accompanying drawings, by way of example only, wherein:

Figure 1 is an elevational view of the revolving advertising light, with major portions being broken away to show other portions in section for greater detail;

Figure 2 is a horizontal sectional view as taken along the plane of line 2—2 in Figure 1 illustrating the construction of the drum and of the source of illumination in detail;

Figure 3 is a horizontal sectional view as taken along the plane of line 3—3 in Figure 1 illustrating the means for driving the source of illumination and the drum; and Figure 4 is a perspective view of the latch mechanism utilized to stop the rotation of the drum.

With continuing reference to the accompanying drawings wherein like reference numerals designate similar parts throughout the various views, reference numeral 10 generally designates the revolving advertising light comprising the present invention. The revolving advertising light 10 includes an outer casing 12 including an upper housing section 14 and a lower housing section 16 which carry therebetween a transparent casing 18. The transparent casing has its upper and lower ends, as at 20, fitted between the upper and lower housings 14 and 16 and suitable mounting plates, as at 22.

Mounted in the upper housing section 14 is an electric motor 24 which drives a shaft 26 journaled in a bearing 28 of a mounting plate 29 and having secured thereto a source of illumination such as a seal beam type light 30 which has a shaft 32 at its lower end journaled in a bearing 34 carried by mounting plate 36.

Rotatably positioned about the shaft 26 is a sleeve 40 which is journaled in a bearing 42 in the mounting plate 44. Secured to the sleeve 40 by any suitable means is a drum 46 which includes lenses 48, 50 and 52, see Figure 2, which are secured to the annular flanged rings 54 and 56 held by suitable spokes 58, 60, 62 and 64 to the sleeve 40 and to a plate 66 rotatable with respect to the shaft 32.

The lenses 48, 50 and 52 are of separately colored transparent material, such as glass or the like, and may be colored red, yellow and green, for example.

Mounted on the shaft 32 and rotatable therewith is a commutator disk 70 which has commutator rings 72 and 74 engageable by resilient contacts 76 and 78 for enabling the connection of the source of illumination 30 to a suitable source of electrical power.

The contacts 76 and 78 are mounted on a suitable insulative block 80 carried between plates 36 and 82 which are held in spaced relationship by means of spacer pins 84.

Between the plates 29 and 44, which are held apart by spacer pins 86, a suitable gear assembly is provided for assuring rotation of the drum 46. Mounted on the shaft 26, there is a gear 88 which intermeshes with a gear 90 mounted on another shaft 92 journaled in a bearing 93 carried by the plate 29. This causes the shaft 92 to be rotated in conjunction with the shaft 26. Mounted on the shaft 92 is another sector gear 94, the construction of which can be best seen in Figure 3. The gear 94 has its teeth 96 extending only two-thirds of the distance therearound, the portion 98 of the gear 94 not being provided with teeth.

Mounted on the gear 94 is a cam 100 which is engageable by a roller 102 mounted on the arm 104 of a latch pivotally mounted, as at 106, for pivotal action with respect to the plate 44. Hence, as the gear 94 is rotated, the latch 104 will be pivoted so that the downwardly depending end portion 108 thereof can extend through the aperture 110 in the plate 44 for engagement with one of the spokes 58, 60 or 62 to bring the drum 46 to a smooth stop. Then, after the gear 94 has rotated so that the teeth 96 thereof engage with the teeth of the gear 112, the gear 112 being secured to the sleeve 40 and rotatable with respect to the shaft 26, the drum 46 will again be rotated. A catch 114 is provided for preventing backward movement of the drum.

In order to direct the rays of light emanating from the light source 30 outwardly of the drum 50, a suitable light blind of desired shape, as at 118, is provided to confine the light beams to one lens.

Hence, operation of the motor 24 causes a rotation of the drum 46 and the light source so that the light source which revolves inside the group of colored transparent lenses 48, 50 and 52 will cause a beam of light to appear with a different color on every revolution of the lamp until it completes three revolutions or one complete cycle when observed from any particular or chosen angle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

An illuminating display device comprising an outer casing, an inner drum mounted in said casing, said drum being of cylindrical shape formed of a plurality of varied colored lenses each in the shape of a portion of a cylinder and arranged in abutting relationship, a source of illumination within said drum, said source of illumination having shafts extending outwardly therefrom, said shafts being journaled in said outer casing, means for confining the light rays emitted by said source of illumination to a beam of dimensions substantially equal to the dimensions of one of said lenses, means for rotating said source of illumination connected to one of said shafts, and gear means connected to said one of said shafts for intermittently rotating said drum, said gear means including another shaft journaled in said outer casing, gears driving said another shaft in response to rotation of said one of said shafts, a sleeve on said one of said shafts connected to said drum, a driven gear secured to said sleeve, a sector gear on said another shaft intermittently engaging said driven gear, and means for stopping rotation of said drum including a cam on said sector gear, and a latch pivotally mounted in said outer casing engageable with said drum to stop said drum when said latch is engaged by said cam.

References Cited in the file of this patent

UNITED STATES PATENTS

| | | |
|---|---|---|
| 1,824,270 | Holzman | Sept. 22, 1931 |
| 2,003,022 | Thompson | May 28, 1935 |
| 2,221,272 | Snelling | Nov. 12, 1940 |
| 2,530,044 | Castillon | Nov. 14, 1950 |